United States Patent
Grover

(10) Patent No.: US 8,877,155 B1
(45) Date of Patent: Nov. 4, 2014

(54) HYDROGEN PRODUCTION USING OFF-GASES FROM GTL PROCESSES

(71) Applicant: L'Air Liquide, Société Anonyme pour l'Étude et l'Éxploitation des Procédés Georges Claude, Paris (FR)

(72) Inventor: Bhadra S. Grover, Sugar Land, TX (US)

(73) Assignee: L'Air Liquide, Société Anonyme pour l'Étude et l'Éxploitation des Procédés Georges Claude, Paris (FR)

( * ) Notice: Subject to any disclaimer, the term of this patent is extended or adjusted under 35 U.S.C. 154(b) by 0 days.

(21) Appl. No.: 13/915,865

(22) Filed: Jun. 12, 2013

Related U.S. Application Data

(60) Provisional application No. 61/658,599, filed on Jun. 12, 2012.

(51) Int. Cl.
  *C01B 3/24* (2006.01)
  *C01B 3/58* (2006.01)
(52) U.S. Cl.
  CPC .................................... *C01B 3/583* (2013.01)
  USPC .......................................................... 423/650
(58) Field of Classification Search
  USPC .......................................................... 423/650
  See application file for complete search history.

(56) References Cited

U.S. PATENT DOCUMENTS

| | | | |
|---|---|---|---|
| 7,540,893 B2 * | 6/2009 | Liu et al. ...................... | 48/127.9 |
| 7,871,577 B2 | 1/2011 | Allam et al. | |
| 7,985,399 B2 * | 7/2011 | Drnevich et al. ............. | 423/652 |
| 8,123,827 B2 * | 2/2012 | Robinson .................... | 48/197 R |
| 2010/0292424 A1 * | 11/2010 | Wu et al. ...................... | 526/170 |
| 2011/0098367 A1 * | 4/2011 | Assink et al. ................. | 518/705 |

FOREIGN PATENT DOCUMENTS

EP  1860063 A1 * 11/2007

* cited by examiner

*Primary Examiner* — Melvin C Mayes
*Assistant Examiner* — Kenneth Vaden
(74) *Attorney, Agent, or Firm* — Justin K. Murray

(57) ABSTRACT

A method for producing hydrogen from an off-gas originating from a gas to liquid (GTL) process is provided. The method includes separating the light ends from the hydrocarbons using a cryogenic distillation column and then processing the light ends and the hydrocarbons to produce additional hydrogen product. The light ends are introduced to a CO shift reactor in the presence of steam to convert CO to $CO_2$ and hydrogen. The hydrocarbons are introduced to a steam methane reformer in the presence of steam to convert hydrocarbons to hydrogen and CO. The resulting stream is treated in a second CO shift reactor to produce additional hydrogen and $CO_2$. The hydrogen is then captured using a pressure swing absorber.

8 Claims, 1 Drawing Sheet

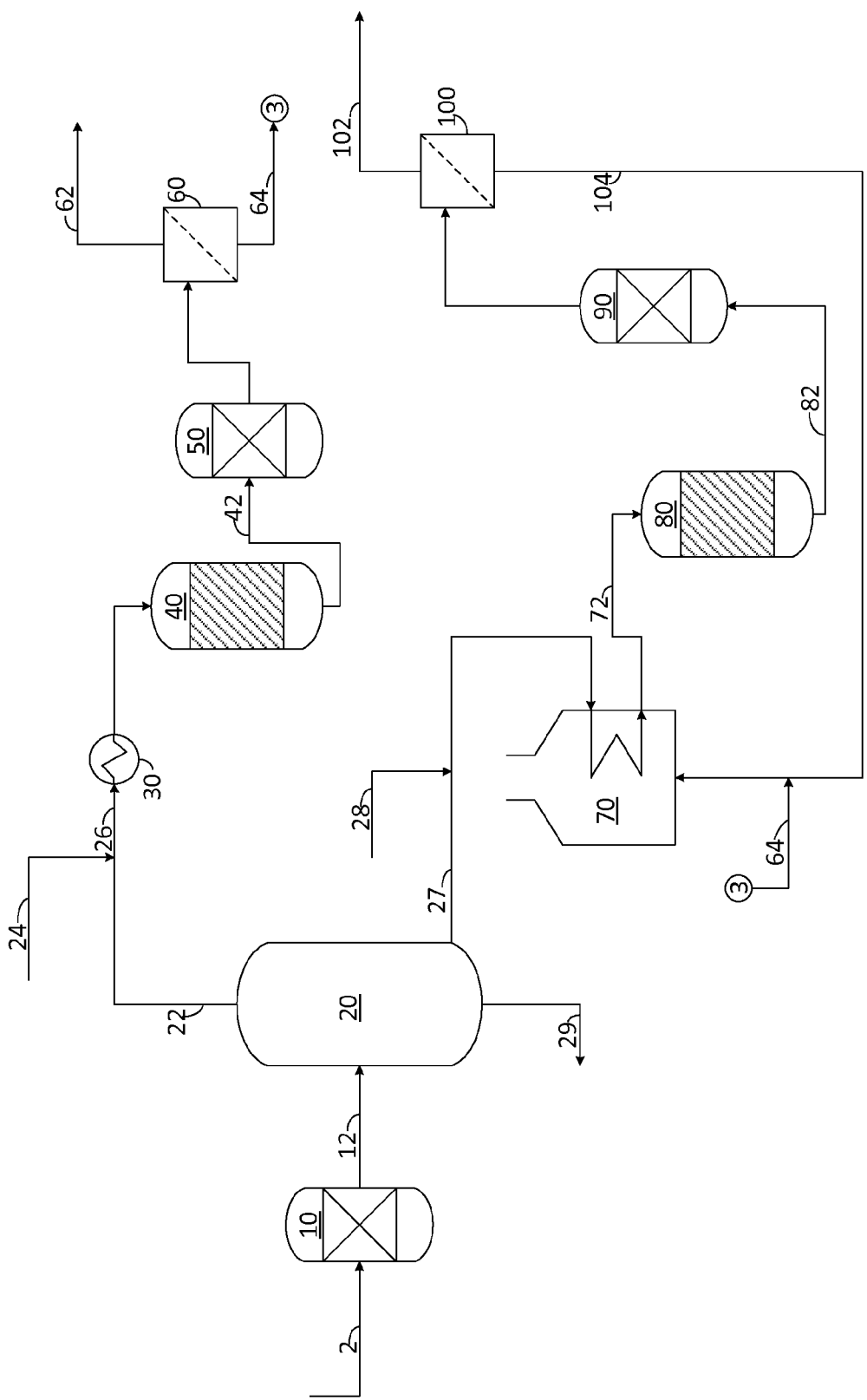

US 8,877,155 B1

HYDROGEN PRODUCTION USING OFF-GASES FROM GTL PROCESSES

RELATED APPLICATION

This patent application claims priority to U.S. Provisional Patent Application Ser. No. 61/658,599 filed on Jun. 12, 2012, which is hereby incorporated by reference in its entirety.

TECHNICAL FIELD OF INVENTION

The present invention relates to a method for the purification of inert gases. More specifically, the present disclosure relates to a method for the onsite removal of trace impurities, such as nitrogen and methane, from an argon stream using cryogenic distillation separation.

BACKGROUND OF THE INVENTION

Natural gas can be converted to liquid fuels, such as gasoline, for use in transport vehicles. One of the more common methods of converting natural gas to liquid fuels is via syngas generation, which creates a $H_2+CO$ mixture, and then using a Fischer Tropsche (FT) reaction to generate the gasoline. The FT reaction also generates light-end byproducts, such as LPG and olefins, along with some inert molecules that were also in the syngas, such as $N_2$, Ar, and unconverted $CH_4$. These light-end products are also known as off-gases. Typically, these off-gases are burnt, with the heat being utilized for heating other streams, generating steam, and/or to produce power. However, there can be environmental concerns with the combustion of these off-gases.

Previous efforts to reform the off-gas have included steam-reforming or partial-oxidation. However, these efforts have faced serious challenges related to:
- substantial quantities of inert gases such as $N_2$ and Ar, which require larger sizes of equipment and reduce thermal efficiencies of the process;
- presence of a large amount of CO, which greatly increases the potential for metal dusting of various pieces of equipment;
- presence of olefins, which can decompose causing carbon formation and can require an additional hydrogenation step, further adding complexity to the system.

Therefore, it would be beneficial to have a method of using these off-gases for another purpose that may bring higher value while also reducing the impact to the environment.

SUMMARY OF THE INVENTION

The present invention relates to a method that satisfies at least one of these needs. In one embodiment, a method for producing hydrogen using off-gases from a gas to liquid (GTL) process is provided. In one embodiment, the method can include feeding the off-gas, which has preferably had $CO_2$ and $H_2O$ removed, to a cryogenic distillation column to produce a light ends and a heavy ends comprised of hydrocarbons. The light ends can include $H_2$, $N_2$, Ar and CO. The light ends can be processed in a CO shift reactor under conditions operable to produce additional $H_2$ and $CO_2$. The $H_2$ can then be captured using a pressure swing absorber (PSA), with the remaining tail gas being used as fuel, preferably in a steam methane reactor (SMR).

In one embodiment, a method for producing hydrogen from an off-gas originating from a gas to liquid (GTL) process is provided. The method includes:

providing an off-gas stream originating from a gas to liquid (GTL) process, the off-gas stream comprising hydrogen, nitrogen, argon, carbon monoxide, and hydrocarbons;

introducing the off-gas stream to a cryogenic unit having a cryogenic distillation column under separation conditions sufficient to affect separation of light ends and heavy ends, the light ends comprising $H_2$, $N_2$, Ar and CO, the heavy ends comprising hydrocarbons;

withdrawing the light ends from the cryogenic distillation column and introducing the light ends in the presence of steam to a first CO shift reactor under conditions operable to produce a first shift stream, wherein the first shift stream comprises an increased amount of $H_2$ and $CO_2$ as compared to the light ends;

introducing the first shift stream to a first pressure swing absorber (PSA) to produce a first hydrogen product stream and a first tail gas, the first tail gas comprising $CO_2$;

withdrawing the heavy ends from the cryogenic distillation column and introducing the heavy ends in the presence of steam to a steam methane reformer (SMR) under conditions operable to reform the hydrocarbons to produce a reformed stream, wherein the reformed stream comprises an increased amount of $H_2$ and CO as compared to the heavy ends;

introducing the reformed stream to a second CO shift reactor under conditions operable to produce a second shift stream, wherein the second shift stream comprises an increased amount of $H_2$ and $CO_2$ as compared to the reformed stream; and introducing the second shift stream to a second pressure swing absorber (PSA) to produce a second hydrogen product stream and a second tail gas, the second tail gas comprising $CO_2$ and unreacted hydrocarbons.

Optional embodiments can also includes any combination of following steps:
- using the first tail gas as fuel;
- using the second tail gas as fuel;
- introducing the first tail gas to burners of the SMR to be used as fuel;
- introducing the second tail gas to burners of the SMR to be used as fuel;
- removing $N_2$ and Ar from the light ends prior introducing the light ends to the first CO shift reactor;
- removing olefins from the heavy ends withdrawn from the cryogenic distillation column prior to introducing the heavy ends to the SMR; and
- drying and removing $CO_2$ from the off-gas stream prior to introducing the off-gas stream to the cryogenic unit.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 shows one embodiment of the invention.

DETAILED DESCRIPTION

While the invention will be described with several embodiments, it is understood that one of ordinary skill in the relevant art will appreciate that many examples variations, and alterations to the following details are within the scope and spirit of the invention. Accordingly, the exemplary embodiments of the invention described herein are set forth without any loss of generality, and without imposing limitations, relating to the claimed invention.

In one embodiment, the present invention describes a method capable of producing hydrogen using the off-gas from a GTL process. Off-gas from a GTL process typically contains various components, such as hydrogen, nitrogen, argon, carbon monoxide, carbon dioxide, methane, ethane, liquefied petroleum gas (LPG), other light olefins, and the like. A sample composition for off-gas can be found in Table I below:

TABLE I

Composition of Off-gas

| Component | % (Mol) |
|---|---|
| $H_2$ | 10-25 |
| $N_2$/Ar | 2-10 |
| CO | 10-30 |
| $CO_2$ | 15-30 |
| $CH_4$ | 20-35 |
| $C_2H_6$ | 1-3 |
| LPG | 2-4 |
| $C_2, C_3, C_4$ Olefins | 1-3 |

In one embodiment of the invention, the method can include providing an off-gas stream having a composition generally in line with that of Table I as a feed gas. $CO_2$ is removed from the feed gas, and the feed gas is dried before being fed to a cryogenic unit. The cryogenic unit then separates light gases such as $H_2$, $N_2$, Ar and CO from the remaining hydrocarbons. In one alternate embodiment, $N_2$ and Ar can be further separated from $H_2$ and CO, if desired. The heavy hydrocarbons, olefins, and LPG can also be separated from light hydrocarbon, such as methane.

The light gases, which comprise $H_2$ and CO (and some $N_2$ and Ar if not already previously separated) are further processed in a CO shift reactor. Steam is added upstream of the CO shift reactor, and the combined stream is heated to a desired temperature that is effective for conducting a CO shift. The amount of steam required and the temperature at the inlet to the CO shift is well known to those skilled in the art. CO and steam react over a catalyst bed to form $H_2$ and $CO_2$. $CO_2$ formed may be removed if desired, upstream of a PSA, thereby producing a highly pure $H_2$ product and tail gas. In one embodiment, the tail gas can be used as fuel, preferably in a steam methane reformer (SMR).

In another embodiment, the hydrocarbon stream from the cryogenic unit is mixed with steam and sent to an SMR to produce a reformed stream. In an alternate embodiment, the hydrocarbon stream may be pretreated, especially if it contains olefins. The reformed stream is passed through a CO shift reactor, and $CO_2$ removal unit (if desired), before it is sent to a PSA unit producing a highly pure $H_2$ product. In one embodiment, the second PSA tail gas can be used as fuel, preferably in the SMR. Since a substantial amount of the CO has been removed from the hydrocarbons, the hydrogenation of olefins becomes easier. Furthermore, removal of CO also takes away the problem of metal dusting and coking in the SMR.

FIG. 1 provides an illustration of an embodiment of the present invention. Off-gas stream 2 is provided and introduced to $CO_2$ removal unit and drier 10 in order to remove a substantial amount of $CO_2$ and water to produce dry off-gas stream 12. Dry off-gas stream 12 is then introduced to cryogenic unit 20, which is operable to separate light gases from hydrocarbons using a cryogenic distillation column. Light ends 22, which contain $H_2$ and CO (and some $N_2$ and Ar if not already previously separated) are then withdrawn from cryogenic unit 20 and combined with steam 24 to form wet light ends 26. In one embodiment, light ends 22 has at least 90% mole recovery of both hydrogen and CO as compared to dry off-gas stream 12 (e.g., if there were 10 moles of hydrogen and 10 moles of CO in dry off-gas stream 12, then light ends 22 would have at least 9 moles of each). Wet light ends 26 is then heat in heat exchanger 30 to a desired temperature that is effective for conducting a CO shift. The amount of steam required and the temperature at the inlet to the CO shift is well known to those skilled in the art.

Once wet light ends 26 is at the appropriate temperature, it can be then fed into first CO shift reactor 40, where the CO and steam react over a catalyst bed to form $H_2$ and $CO_2$ to produce first shift stream 42. In an optional step, $CO_2$ can be removed in second $CO_2$ removal unit 50 upstream of first PSA 60. First shift stream 42 is then fed to first PSA 60, thereby producing first hydrogen product stream 62 and first tail gas 64. In an optional embodiment, first tail gas 64 can be fed to SMR 70 to be used as fuel for burners within SMR 70.

Hydrocarbons 27 are also withdrawn from cryogenic unit 20 and combined with steam 28 before being introduced into SMR 70. In one embodiment, hydrocarbons 27 has at least 70% mole recovery of methane and 90% mole recovery of olefins as compared to dry off-gas stream 12 (e.g., if there were 10 moles of methane and 10 moles of olefins in dry off-gas stream 12, then hydrocarbons 27 would have at least 7 moles methane and 9 moles of olefins). Within SMR 70, methane within hydrocarbons 27 react with water to produce reformed stream 72, which has increased amounts of $CO_2$ and hydrogen. Reformed stream 72 is then passed through second $CO_2$ shift reactor 80 to form second shift stream 82 before being sent to second PSA 100, to produce second hydrogen product stream 102 and second tail gas 104. In an optional embodiment, $CO_2$ can be removed from second shift stream 82 in third $CO_2$ removal unit 90 upstream of first PSA 60. In an optional embodiment, second tail gas 104 can be fed to SMR 70 to be used as fuel for burners within SMR 70. In an additional embodiment, hydrocarbons heavier than methane can be separated from methane within cryogenic unit 20 and withdrawn as heavy hydrocarbons 29, such that heavy hydrocarbons 29 consists essentially of heavier hydrocarbons, such as ethane, LPG, ethene, propene, butene and the like. In one embodiment, heavy hydrocarbons 29 have substantially more olefins as compared to hydrocarbons 27. In an embodiment not shown, if olefins are present in heavy hydrocarbons 29, this stream can be hydrogenated and then combined with hydrocarbons 27 prior to SMR 70 to increase overall hydrogen recovery.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A method for producing hydrogen from an off-gas originating from a gas to liquid (GTL) process, the method comprising the steps of:

providing an off-gas stream originating from a gas to liquid (GTL) process, the off-gas stream comprising hydrogen, nitrogen, argon, carbon monoxide, and hydrocarbons;

introducing the off-gas stream to a cryogenic unit having a cryogenic distillation column under separation conditions sufficient to affect separation of light ends and heavy ends, the light ends comprising $H_2$, $N_2$, Ar and CO, the heavy ends comprising hydrocarbons;

withdrawing the light ends from the cryogenic distillation column and introducing the light ends in the presence of steam to a first CO shift reactor under conditions operable to produce a first shift stream, wherein the first shift stream comprises an increased amount of $H_2$ and $CO_2$ as compared to the light ends;

introducing the first shift stream to a first pressure swing absorber (PSA) to produce a first hydrogen product stream and a first tail gas, the first tail gas comprising $CO_2$;

withdrawing the heavy ends from the cryogenic distillation column and introducing the heavy ends in the presence of steam to a steam methane reformer (SMR) under conditions operable to reform the hydrocarbons to produce a reformed stream, wherein the reformed stream comprises an increased amount of $H_2$ and CO as compared to the heavy ends;

introducing the reformed stream to a second CO shift reactor under conditions operable to produce a second shift stream, wherein the second shift stream comprises an increased amount of $H_2$ and $CO_2$ as compared to the reformed stream; and introducing the second shift stream to a second pressure swing absorber (PSA) to produce a second hydrogen product stream and a second tail gas, the second tail gas comprising $CO_2$ and unreacted hydrocarbons.

2. The method as claimed in claim 1, further comprising the step of using the first tail gas as fuel.

3. The method as claimed in claim 1, further comprising the step of using the second tail gas as fuel.

4. The method as claimed in claim 1, further comprising the step of introducing the first tail gas to burners of the SMR to be used as fuel.

5. The method as claimed in claim 1, further comprising the step of introducing the second tail gas to burners of the SMR to be used as fuel.

6. The method as claimed in claim 1, further comprising the step of removing $N_2$ and Ar from the light ends prior introducing the light ends to the first CO shift reactor.

7. The method as claimed in claim 1, further comprising the step of removing olefins from the heavy ends withdrawn from the cryogenic distillation column prior to introducing the heavy ends to the SMR.

8. The method as claimed in claim 1, further comprising the step of drying and removing $CO_2$ from the off-gas stream prior to introducing the off-gas stream to the cryogenic unit.

* * * * *